US012665245B2

(12) United States Patent　　　　(10) Patent No.:　US 12,665,245 B2
Park et al.　　　　　　　　　　　　(45) Date of Patent:　Jun. 23, 2026

(54) BATTERY CELL AND BATTERY MODULE INCLUDING THE SAME

(71) Applicant: LG Energy Solution, Ltd., Seoul (KR)

(72) Inventors: Won Kyoung Park, Daejeon (KR); Junyeob Seong, Daejeon (KR); Subin Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 713 days.

(21) Appl. No.: 17/924,074

(22) PCT Filed: Jan. 3, 2022

(86) PCT No.: PCT/KR2022/000007
§ 371 (c)(1),
(2) Date: Nov. 8, 2022

(87) PCT Pub. No.: WO2022/169112
PCT Pub. Date: Aug. 11, 2022

(65) Prior Publication Data
US 2023/0178828 A1　　Jun. 8, 2023

(30) Foreign Application Priority Data
Feb. 3, 2021　(KR) ........................ 10-2021-0015510

(51) Int. Cl.
*H01M 50/178*　　(2021.01)
*H01M 50/184*　　(2021.01)
(Continued)

(52) U.S. Cl.
CPC ....... *H01M 50/178* (2021.01); *H01M 50/184* (2021.01); *H01M 50/211* (2021.01); *H01M 50/581* (2021.01)

(58) Field of Classification Search
CPC ............. H01M 50/178; H01M 50/211; H01M 50/581; H01M 50/184
See application file for complete search history.

(56) References Cited

U.S. PATENT DOCUMENTS 8,795,883 B2 　　8/2014　Shin et al.
2017/0110696 A1* 　4/2017　Schoenherr ....... H01M 10/0525
(Continued)

FOREIGN PATENT DOCUMENTS

CN　　108028415 A　　5/2018
JP　　H06062457 U　　9/1994
(Continued)

OTHER PUBLICATIONS

EPO machine generated English translation of KR 2018-0130892 A (Year: 2018).*
(Continued)

*Primary Examiner* — Kimberly Wyluda
(74) *Attorney, Agent, or Firm* — Lerner David LLP

(57) ABSTRACT
A battery cell according to the present disclosure can include a battery case that has an electrode assembly mounted therein. The battery case can include a sealing part having a structure in which the outer peripheral side is sealed by heat fusion. An electrode lead that is electrically connected to the electrode tab can be included in the electrode assembly. The electrode lead can protrude outward from the battery case via the sealing part. A lead film can be located between the electrode lead and the sealing part. A protective member can be in contact with at least a part of an outer surface of the electrode lead. The size of the protective member can vary based on the temperature of the electrode lead.

15 Claims, 5 Drawing Sheets

(51) Int. Cl.
    *H01M 50/211*    (2021.01)
    *H01M 50/581*    (2021.01)

(56)           References Cited

U.S. PATENT DOCUMENTS

| | | |
|---|---|---|
| 2018/0219247 A1 | 8/2018 | Park |
| 2018/0269435 A1 | 9/2018 | Lee et al. |
| 2018/0315979 A1 | 11/2018 | Ryu et al. |
| 2020/0373549 A1 | 11/2020 | Song et al. |

FOREIGN PATENT DOCUMENTS

| | | | | |
|---|---|---|---|---|
| JP | 2003045492 A | | 2/2003 | |
| KR | 20080015164 A | * | 2/2008 | .......... H01M 50/581 |
| KR | 100858796 B1 | | 9/2008 | |
| KR | 2013-0114022 A | * | 10/2013 | |
| KR | 20140087773 A | | 7/2014 | |
| KR | 101441207 B1 | | 9/2014 | |
| KR | 101671486 B1 | | 11/2016 | |
| KR | 20180082748 A | | 7/2018 | |
| KR | 2018-0130892 A | * | 12/2018 | |

| | | | | |
|---|---|---|---|---|
| KR | 20190006643 A | | 1/2019 | |
| KR | 2019-0019461 A | * | 2/2019 | |
| KR | 102065372 B1 | | 1/2020 | |
| KR | 20200129429 A | | 11/2020 | |
| WO | 2015-046744 A1 | | 4/2015 | |

OTHER PUBLICATIONS

EPO machine generated English translation of KR 2019-0019461 A (Year: 2019).*

EPO machine generated English translation of KR 2013-0114022A (Year: 2013).*

EPO machine generated English translation of KR-20080015164-A (Year: 2008).*

International Search Report for Application No. PCT/KR2022/000007 mailed Apr. 12, 2022, 2 pages.

Extended European Search Report including Written Opinion for Application No. 22749866.4 dated Sep. 9, 2024. 10 pgs.

Search Report dated Oct. 28, 2025 from the Office Action for Chinese Application No. 202280004287.8 issued Oct. 31, 2025, 2 pages.

* cited by examiner

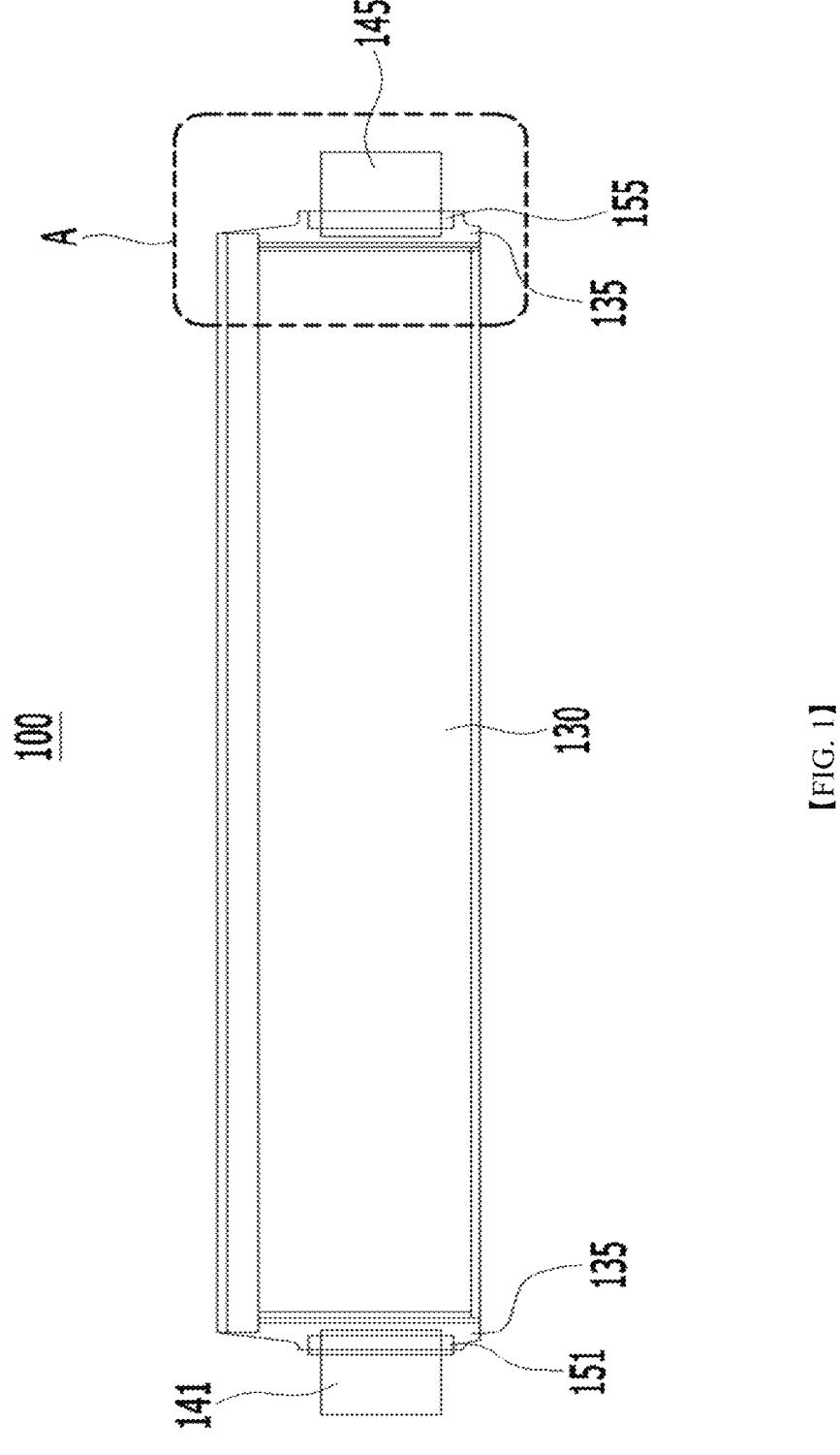
[FIG. 1]

【FIG. 2】
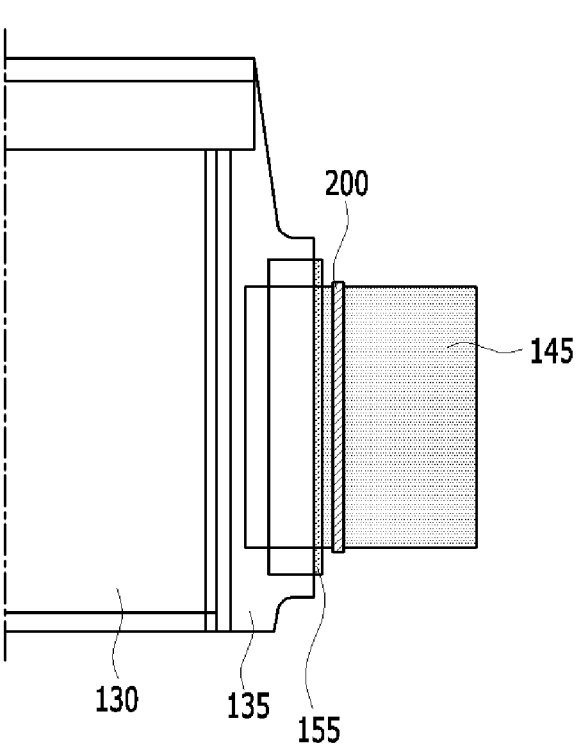

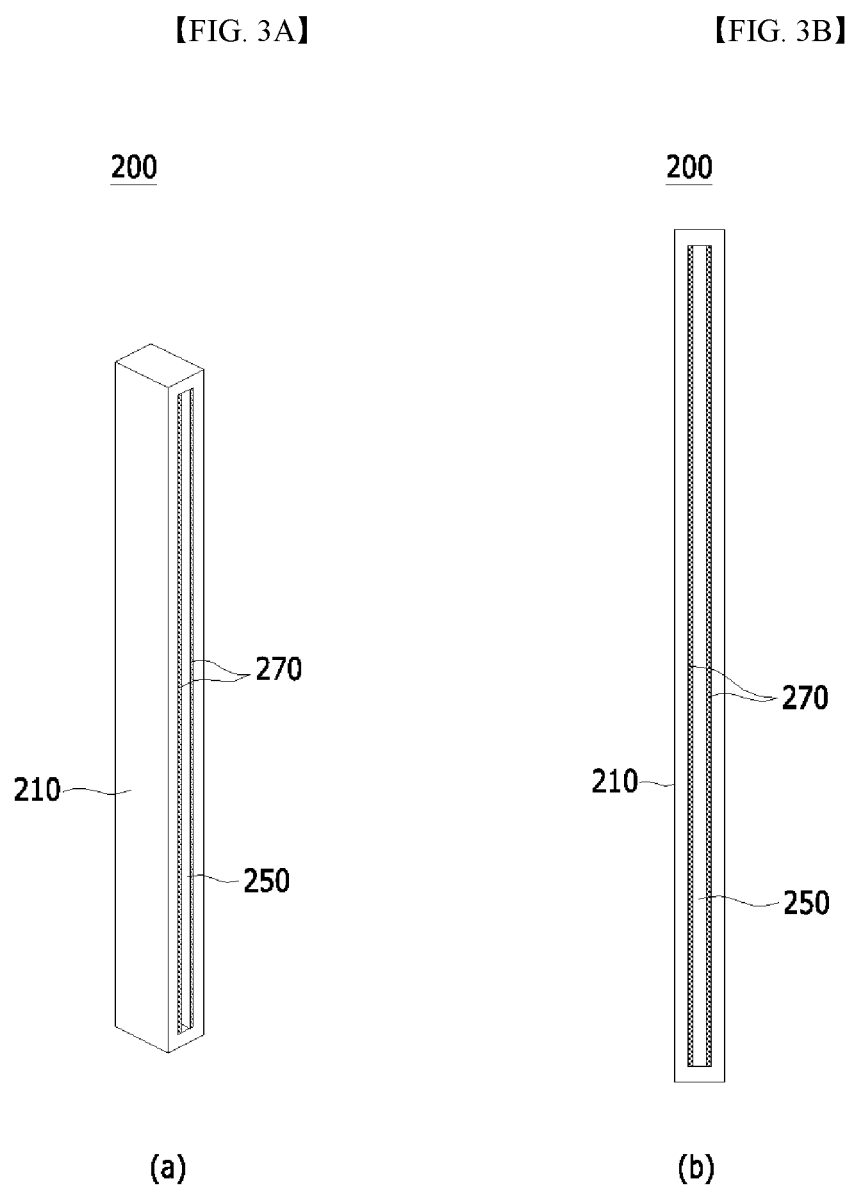

【FIG. 4】
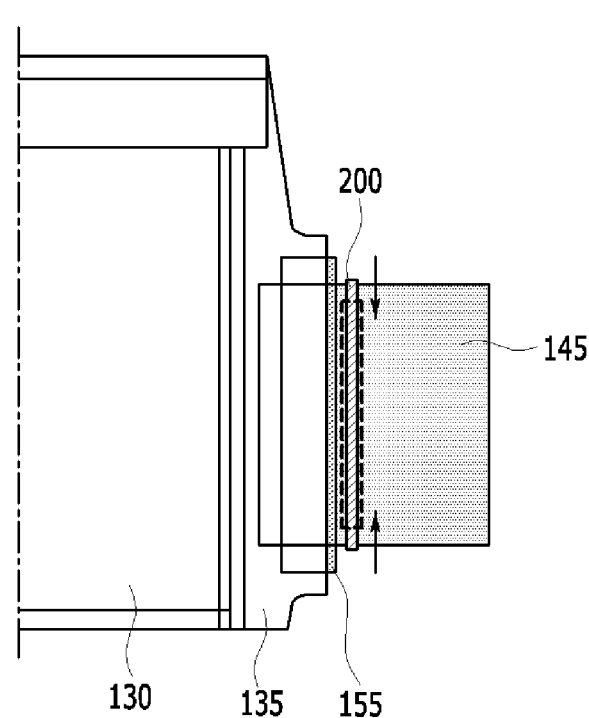

【FIG. 5】
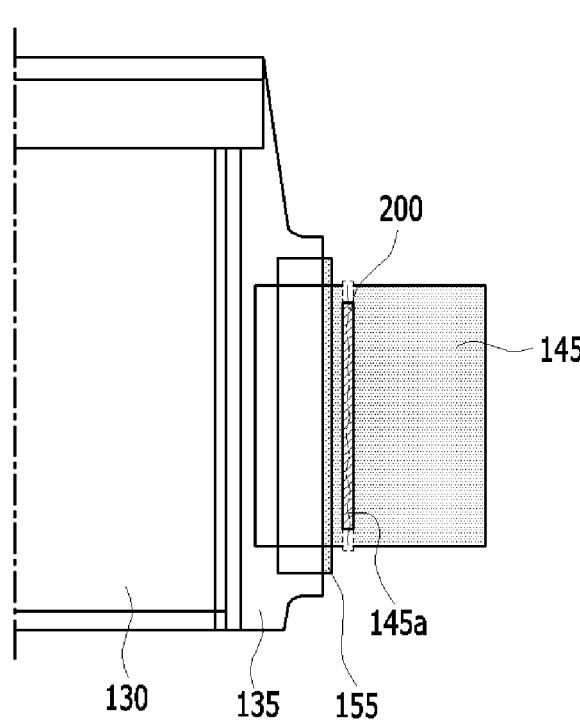

BATTERY CELL AND BATTERY MODULE INCLUDING THE SAME

CROSS CITATION WITH RELATED APPLICATION(S)

This application is a national phase entry under 35 U.S.C. § 371 of International Application No. PCT/KR2022/000007 filed on Jan. 3, 2022, which claims the benefit of Korean Patent Application No. 10-2021-0015510 filed on Feb. 3, 2021, with the Korean Intellectual Property Office, the contents of both of which are incorporated herein by reference in their entirety.

TECHNICAL FIELD

The present disclosure relates to a battery cell and a battery module including the same, and more particularly, to a battery cell with improved safety and a battery module including the same.

BACKGROUND

Along with the technology development and increased demand for mobile devices, demand for secondary batteries as energy sources has been increasing rapidly. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

Based on the shape of a battery case, a secondary battery is classified into a cylindrical battery where an electrode assembly is mounted in a cylindrical metal can, a prismatic battery where an electrode assembly is mounted in a prismatic metal can, and a pouch-type battery where an electrode assembly is mounted into a pouch type case formed of an aluminum laminate sheet. Here, the electrode assembly mounted in the battery case is an electricity-generating device enabling charge and discharge that has a structure of a cathode, an anode, and a separator interposed between the cathode and the anode, and is divided into a jelly-roll type in which an electrode assembly including a separator interposed between the cathode and the anode, each made of an active material-coated long sheet, is rolled, and a stack-type in which a plurality of cathodes and a plurality of anodes are stacked in this order such that a separator is interposed between the cathode and the anode.

Among them, in particular, a pouch-type battery having a structure in which a stack-type or stack/folding-type electrode assembly is mounted in a pouch-type battery case of an aluminum laminate sheet is gradually increasing in its usage amount due to low manufacturing cost, small weight, easy deformation, and the like.

Along with this, as the demand for secondary batteries increases, the demand for increasing the capacity or partial energy density of the secondary batteries continuously increases, and accordingly, the demand for the safety of the battery cells also tends to gradually increase.

However, in the case of a pouch battery, there is a problem that some battery cells may generate excessive heat due to overcurrent or other causes, and then reach a thermal runaway state to cause ignition. Therefore, when the battery cell generates abnormal heat, there is a need to develop a battery cell that can physically interrupt the current of the battery cell and ensure the safety of the user.

DETAILED DESCRIPTION OF THE INVENTION

Technical Problem

It is an object of the present disclosure to provide a battery cell with improved safety in which a protective member capable of interrupting the current flow of the battery cell is located on the electrode lead, and a battery module including the same.

The objects of the present disclosure are not limited to the aforementioned objects, and other objects which are not described herein should be clearly understood by those skilled in the art from the following detailed description and the accompanying drawings.

Technical Solution

According to one aspect of the present disclosure, there is provided a battery cell comprising: a battery case that has an electrode assembly mounted therein and includes a sealing part having a structure in which the outer peripheral side is sealed by heat fusion; an electrode lead that is electrically connected to the electrode tab included in the electrode assembly and protrudes outward from the battery case via the sealing part; a lead film that is located between the electrode lead and the sealing part; and a protective member in contact with at least a part of an outer surface of the electrode lead, wherein the size of the protective member differs depending on the temperature of the electrode lead.

The protective member extends along the width direction of the electrode lead, and may surround the outer surface of the electrode lead.

The protective member is reduced at a first temperature along at least one of a width direction of the electrode lead and a thickness direction of the electrode lead.

The protective member may be made of a shape memory alloy (SMA).

The first temperature may be a temperature of 60 degrees Celsius or more.

The protective member may be formed at a position adjacent to the lead film.

The protective member includes a main body part and an opening formed in the center of the main body part, and the electrode lead is inserted into the opening, wherein the main body part may surround the outer surface of the electrode lead.

A thickness of the opening may be greater than or equal to the thickness of the electrode lead.

An adhesive layer may be formed on at least one surface of the opening.

According to another aspect of the present disclosure, there is provided a battery module comprising the above-mentioned battery cell.

Advantageous Effects

According to embodiments of the present disclosure, a protective member capable of interrupting the current flow of the battery cell can be located on the electrode lead, thereby improving safety.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a front view showing a battery cell according to the present embodiment;

FIG. 2 is an enlarged view showing a region A of FIG. 1;

FIG. 3A is an isometric view of the protective member of FIG. 2;

FIG. 3B is a front view of the protective member of FIG. 2;

FIG. 4 shows a region A of FIG. 1 at a high temperature in a first condition; and FIG. 5 shows the region A of FIG. 1 at a high temperature in a second condition.

DETAILED DESCRIPTION OF THE
EMBODIMENTS

Hereinafter, various embodiments of the present disclosure will be described in detail with reference to the accompanying drawings so that those skilled in the art can easily carry out them. The present disclosure can be modified in various different ways, and is not limited to the embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

Further, throughout the specification, when a portion is referred to as "including" or "comprising" a certain component, it means that the portion can further include other components, without excluding the other components, unless otherwise stated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed "on" or "above" the reference portion toward the opposite direction of gravity.

Further, throughout the specification, when referred to as "planar", it means when a target portion is viewed from the upper side, and when referred to as "cross-sectional", it means when a target portion is viewed from the side of a cross section cut vertically.

Now, the battery cell 100 according to an embodiment of the present disclosure will be described. However, description will be given with reference to the front surface of the front and back surfaces of the battery cell 100, but the present disclosure is not limited thereto, and even in the case of the rear surface of the battery cell 100, it will be described in the same or similar manner.

FIG. 1 is a front view showing a battery cell according to the present embodiment.

Referring to FIG. 1, the battery cell 100 according to an embodiment of the present disclosure includes an electrode assembly (not shown) including a cathode, an anode, and a separator interposed between the cathode and the anode, and a battery case 130 to which the electrode assembly is mounted. Here, the battery cell 100 may include an electrolyte solution together with an electrode assembly (not shown) inside the battery case 130.

In one example, the electrolyte solution means a liquid-state electrolyte, and ions can move between the cathode and the anode. The secondary battery can carry out charge and discharge through ion exchange between the cathode and the anode. The electrolyte used herein may include an organic liquid electrolyte, an inorganic liquid electrolyte, a solid polymer electrolyte, a gel-type polymer electrolyte, a solid inorganic electrolyte, a molten inorganic electrolyte, and the like. However, the present disclosure is not limited thereto.

Also, the battery case 130 has an electrode assembly (not shown) mounted therein and includes a sealing part 135 having a structure in which the outer peripheral side is sealed by heat fusion. The battery case 130 may be a laminated sheet including a resin layer and a metal layer. More specifically, the battery case 130 is made of a laminated sheet, and may include an outer resin layer forming the outermost layer, a barrier metal layer preventing the penetration of materials, and an inner resin layer for sealing. However, the embodiment of the present disclosure is not limited to the above-mentioned structure, and may be replaced with a battery case of a secondary battery having a general structure.

Further, the electrode assembly (not shown) may have a jelly-roll type (winding type), a stack type (lamination type), or a composite type (stack/folding type) structure. More specifically, the electrode assembly (not shown) may include a cathode, an anode, and a separator disposed therebetween.

Further, in the present embodiment, the battery case 130 may have a structure in which the electrode leads 141 and 145 electrically connected to the plurality of electrode tabs (not shown) extending from the electrode assembly (not shown) are sealed so as to be exposed to the outside. More specifically, the electrode leads 141 and 145 may protrude outward from the battery case 130 via the sealing part 135. Further, in the present embodiment, lead films 151 and 155 may be located between the electrode leads 141 and 145 and the sealing part 135.

In one example, the electrode leads 141 and 145 include a cathode lead 141 electrically connected to the cathode tab included in the electrode assembly and an anode lead 145 electrically connected to the anode tab included in the electrode assembly.

Here, the battery cell 100 may be a bidirectional pouch battery cell in which a cathode lead 141 and an anode lead 145 protrude from both sides of the battery case 130, respectively. However, the present disclosure is not limited thereto, and the battery cell 100 may be a unidirectional pouch battery cell in which a cathode lead 141 and an anode lead 145 are disposed together on the same side surface of the battery case 130. Hereinafter, description will be given based on the bidirectional pouch battery cell, but even in the case of the unidirectional pouch battery cell, it will be described in the same and similar manner.

Hereinafter, the protective member 200 located on the electrode leads 141 and 145 will be described. Here, the description will be focused on one end where the anode lead 145 of the battery cell 100 is located, but is not necessarily limited thereto. Even in the case of the other end where the cathode lead 141 is located, it will be described in the same or similar manner FIG. 2 is an enlarged view showing a region A of FIG. 1. FIG. 3 is a diagram showing the protective member of FIG. 2.

Referring to FIG. 2, in the battery cell 100 of the present embodiment, the protective member 200 may contact at least a part of the outer surface of the anode lead 145. That is, the inner surface of the protective member 200 may be in contact with at least a part of the outer surface of the anode lead 145. More specifically, the protective member 200 extends along the width direction of the anode lead 145, and may surround the outer surface of the anode lead 145.

Thereby, in the present embodiment, the protective member 200 may directly receive heat generated from the electrode leads 141 and 145, and the protective member 200 can interrupt current flow as soon as the battery cell 100 overheats.

Also, the protective member 200 may be formed at a position adjacent to the lead film 155. More specifically, the protective member 200 is spaced apart from the sealing part 135, and may be formed in a position adjacent to the lead film 155. Thereby, the influence of the protective member 200 on the battery cell 100 and other adjacent battery cells 100 may be relatively small.

Referring to FIGS. 3A and 3B, the protective member 200 includes a main body 210 and an opening 250 formed in the center of the main body 210. In one example, the main body 210 may be a frame having a frame-like or tubular structure, and the opening 250 may be the central part of the opened main body 210.

Referring to FIGS. 2, 3A and 3B, the electrode leads 141 and 145 are inserted into the opening 250, and the main body 210 may surround the outer, surface of the electrode lead. This is an example, and the protective member 200 can be formed so as to be taped along the width direction of the electrode leads 141 and 145. However, the method of disposing the protective member 200 on the electrode leads 141 and 145 is not limited to the contents described above, and various methods may be applied within a range that does not damage the electrode leads 141 and 145.

Further, the thickness of the opening 250 may be greater than or equal to the thickness of the electrode leads 141 and 145. However, the thickness of the opening 250 may be adjusted within a range that does not damage the electrode leads 141 and 145 while the protective member 200 is disposed on the electrode leads 141 and 145.

Further, the inner surface of the protective member 200 may be attached to at least a part of the outer surface of the electrode leads 141 and 145. Here, in the protective member 200, an adhesive layer 270 may be formed on at least one surface of the opening 250. That is, the adhesive layer 270 may be located between the inner surface of the protective member 200 and the outer surface of the electrode leads 141 and 145. In this case, the adhesive layer 270 may extend along the width direction of the electrode leads 141 and 145. However, the present disclosure is not limited thereto, and the protective member 200 may be fixed through a frictional force between the inner surface of the protective member 200 and the outer surface of the electrode leads 141 and 145.

In one example, the adhesive layer 270 may each consist of a tape or may be formed by coating with an adhesive binder. More preferably, the adhesive layer 270 is coated with an adhesive binder or made of a double-sided tape, so that the inner surface of the protective member 200 and the outer surface of the electrode leads 141 and 145 can be easily fixed. However, the present disclosure is not limited thereto, and any material having adhesive performance capable of fixing the inner surface of the protective member

200 and the outer surface of the electrode leads 141 and 145 to each other can be applied without limitation.

Thereby, the protective member 200 can be stably fixed to the electrode leads 141 and 145.

FIGS. 4 and 5 are diagrams showing region A of FIG. 1 at a high temperature. FIG. 4 is a diagram showing before the protective member 200 of FIG. 2 is reduced at a high temperature, and FIG. 5 is a diagram showing after the protective member 200 of FIG. 2 is reduced at a high temperature.

Referring FIGS. 4 and 5, the size of the protective member 200 may differs depending on the temperature of the electrode leads 141 and 145. In other words, when the protective member 200 receives heat generated from the electrode leads 141 and 145, and the temperature of the electrode leads 141 and 145 is generated above the first temperature, the size of the protective member 200 may differ. More specifically, when the temperature is raised to the first temperature, the protective member 200 may be reduced along at least one of the width direction of the electrode leads 141 and 145 and the thickness direction of the electrode leads 141 and 145. That is, as shown in FIG. 5, a cutting line 145a can be formed on the electrode leads 141 and 145 in contact with the protective member 200. In other words, the electrode leads 141 and 145 may be broken with reference to the cutting line 145a.

In one example, the protective member 200 may be formed of a shape memory alloy (SMA). Here, the shape memory alloy has a property of being reduced to a predetermined size at a specific temperature. That is, the protective member 200 may be made of a shape memory alloy (SMA) that is reduced to a predetermined size at the first temperature.

Here, the size of the protective member 200 reduced by the shape memory alloy (SMA) may be smaller than the width and/or thickness of the electrode leads 141 and 145. In other words, the size of the protective member 200 reduced by the shape memory alloy (SMA) may be a size to which the inner surface of the protective member 200 can apply a pressure enough to break the electrode leads 141 and 145.

More specifically, the protective member 200 may be a highly elastic material consisting of a shape memory alloy such as nitinol. However, the protective member 200 is not limited thereto, and any shape memory alloy having a predetermined elasticity can be applied.

Thereby, as the protective member 200 is reduced to a predetermined size at a specific temperature set by the shape memory alloy (SMA), a cutting line 145a may be formed in the electrode leads 141 and 145. That is, the stability of the battery cell 100 can be further improved while the quality deviation is minimized by automatically physically interrupting the current flow from the inside without performing separate control from the outside.

Here, the first temperature may be a temperature at which an abnormal phenomenon such as an overcurrent flowing occurs. More specifically, the first temperature is a temperature exceeding a temperature range at which the battery cell 100 is safely operated, and may be a temperature at which the battery cell 100 cannot be used. In one example, the first temperature may be a temperature of 60 degrees Celsius or more. That is, the protective member 200 may be reduced along at least one of the width direction of the electrode leads 141 and 145 and the thickness direction of the electrode leads 141 and 145 as heat at a temperature of 60 degrees Celsius or more is transferred.

Thereby, when heat is generated due to overcurrent of the battery cell 100 or other causes, the protective member 200 is reduced at a predetermined temperature, so that cutting lines 145a can be formed on the electrode leads 141 and 145. That is, it is possible to physically interrupt the current flow in consideration of the internal state of the battery cell 100, whereby the stability of the battery cell 100 and the safety of the user can be further improved.

Here, when the electrode leads 141 and 145 generate heat at a temperature of less than 60 degrees Celsius, the protective member 200 may not be reduced. This is because the battery cell 100 is in a simple heat generation state, and it is not necessary to interrupt the current flow in a range in which normal operation is possible.

On the other hand, if heat at a temperature of less than 60 degrees Celsius is transferred to the protective member 200 and the protective member 200 is reduced, the electrode leads 141 and 145 may be unnecessarily broken, and current may be interrupted even though simple heat is generated in the charging/discharging process.

A battery module according to another embodiment of the present disclosure includes the battery cells described above. Thereby, when heat is generated due to overcurrent of some battery cells 100 in the battery module or other causes, the electrode leads 141 and 145 are broken by the protective member 200, thereby limiting the electron transfer with another battery cell 100 having no abnormal phenomenon. That is, the battery cell 100 in which the abnormal phenomenon does not occur can function normally, unlike the battery cell 100 in which the electrode leads 141 and 145 are broken, so that a sudden shutdown of a device including the battery cell 100 can be prevented.

Meanwhile, one or more battery modules according to the present embodiment may also be packaged in a pack case to form a battery pack. The above-mentioned battery module and the battery pack including the same can be applied to various devices. Such a device may be applied to a vehicle means such as an electric bicycle, an electric vehicle, or a hybrid vehicle, but the present disclosure is not limited thereto, and is applicable to various devices that can use a battery module and a battery pack including the same, which also belongs to the scope of the present disclosure.

Although preferred embodiments of the present disclosure have been shown and described above, the scope of the present disclosure is not limited thereto, and numerous other variations and modifications can be made by those skilled in the art using the basic principles of the invention defined in the appended claims, which also falls within the spirit and scope of the invention.

DESCRIPTION OF REFERENCE NUMERALS

100: battery cell
130: battery case
141, 145: electrode leads
151, 155: lead film
200: protective member
210: main body part
250: opening
270: adhesive layer

The invention claimed is:

1. A battery cell comprising:
a battery case with an electrode assembly mounted therein, the battery case including a sealing part, the sealing part having a structure with an outer peripheral side configured to be sealed by heat fusion;

an electrode lead electrically connected to an electrode tab of the electrode assembly, the electrode lead having a top surface, a bottom surface opposite the top surface, and two edge surfaces connecting the top surface and the bottom surface, the electrode lead protruding outward from the battery case through the sealing part;
a lead film located between the electrode lead and the sealing part; and
a protective member in contact with the top surface, the bottom surface and the two edge surfaces of the electrode lead,
wherein the protective member is configured to reduce in size when a temperature of the electrode lead exceeds a first temperature such that the electrode lead is electrically disconnected from the electrode tab.

2. The battery cell of claim 1, wherein the protective member extends along and across a width direction of the electrode lead to surround an outer surface of the electrode lead.

3. The battery cell of claim 2, wherein the protective member is reduced in size at the first temperature along at least one of the width direction of the electrode lead and a thickness direction of the electrode lead.

4. The battery cell of claim 3, wherein the protective member is made of a shape memory alloy (SMA).

5. The battery cell of claim 4, wherein the first temperature is 60 degrees Celsius or more.

6. The battery cell of claim 1, wherein the protective member is disposed adjacent to the lead film.

7. The battery of claim 1, wherein the protective member includes a main body part and an opening formed in a center of the main body part, the electrode lead extending into the opening, the main body part surrounding an surface of the electrode lead.

8. The battery cell of claim 7, wherein a thickness of the opening is greater than or equal to the thickness of the electrode lead.

9. The battery cell of claim 8, wherein an adhesive layer is disposed on at least one surface of the opening.

10. A battery module comprising the battery cell of claim 1.

11. A battery cell comprising:
a battery case with an electrode assembly mounted therein, the battery case including a sealing part, the sealing part having a structure with an outer peripheral side configured to be sealed by heat fusion;
an electrode lead electrically connected to an electrode tab of the electrode assembly, the electrode lead having a top surface, a bottom surface opposite the top surface, and two edge surfaces connecting the top surface and the bottom surface, the electrode lead protruding outward from the battery case through the sealing part;
a lead film located between the electrode lead and the sealing part; and
a protective member in contact with the top surface, the bottom surface and the two edge surfaces of the electrode lead,
wherein the protective member is configured to reduce in size when a temperature of the electrode lead exceeds a first temperature such that the electrode lead is electrically disconnected from the electrode tab,
wherein the protective member is spaced apart from the sealing part and is disposed adjacent to the lead film.

12. The battery cell of claim 11, wherein the protective member extends along and across a width direction of the electrode lead to surround an outer surface of the electrode lead.

12,665,245 B2

9

10

13. The battery cell of claim 2, wherein the protective member is configured to apply an inward pressure when reduced in size at the first temperature along at least one of the width direction of the electrode lead and a thickness direction of the electrode lead such that a cutting line is formed on the electrode lead.

14. The battery cell of claim 13, wherein the protective member is made of a shape memory alloy (SMA) configured to reduce to a predetermined size at the first temperature, wherein the predetermined size is smaller than a width and/or thickness of the electrode lead.

15. The battery cell of claim 11, wherein the protective member includes a main body part having a frame-like structure and an opening formed in a center of the main body part, the electrode lead extending into the opening, the main body part continuously surrounding the top surface, the bottom surface, and the two edge surfaces of the electrode lead.

\* \* \* \* \*